(12) United States Patent
Klemen et al.

(10) Patent No.: US 11,009,085 B2
(45) Date of Patent: May 18, 2021

(54) ELECTROMAGNETIC CLUTCH FOR GAS TURBINE ACCESSORIES

(71) Applicant: Rolls-Royce Corporation, Indianapolis, IN (US)

(72) Inventors: Donald Klemen, Carmel, IN (US); Brian S. Maners, Cloverdale, IN (US); Erik A. Munevar, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 90 days.

(21) Appl. No.: 16/415,580

(22) Filed: May 17, 2019

(65) Prior Publication Data

US 2020/0362922 A1 Nov. 19, 2020

(51) Int. Cl.
*F16D 27/06* (2006.01)
*F16D 27/14* (2006.01)
*F02C 7/32* (2006.01)

(52) U.S. Cl.
CPC ............... *F16D 27/06* (2013.01); *F02C 7/32* (2013.01); *F16D 27/14* (2013.01); *F05D 2260/4023* (2013.01); *F16D 2250/0084* (2013.01)

(58) Field of Classification Search
CPC .. F16D 27/06; F16D 27/14; F16D 2250/0084; F02C 7/32; F05D 2260/4023
See application file for complete search history.

(56) References Cited

U.S. PATENT DOCUMENTS

| | | |
|---|---|---|
| 5,310,034 A | 5/1994 | Bernabei |
| 5,996,759 A | 12/1999 | Aoki et al. |
| 6,209,700 B1 | 4/2001 | Wogaman et al. |
| 6,568,520 B2 | 5/2003 | Hattori et al. |
| 6,578,689 B2 | 6/2003 | Kawada et al. |
| 7,344,479 B2 | 3/2008 | Baek |
| 7,696,146 B2 | 4/2010 | Mock-Knoblauch et al. |
| 8,387,767 B2 | 3/2013 | Komorowski et al. |
| 8,499,916 B2 | 8/2013 | Pardee et al. |
| 8,561,773 B2 | 10/2013 | Fukumoto et al. |
| 8,714,330 B2 | 5/2014 | Toyama et al. |
| 8,733,527 B2 | 5/2014 | Greene |

(Continued)

OTHER PUBLICATIONS

US 9,945,431 B2, 04/2018, Fukumura (withdrawn)

*Primary Examiner* — Huan Le
(74) *Attorney, Agent, or Firm* — Shumaker & Sieffert, P.A.

(57) ABSTRACT

A gearbox rigidly coupled to a static structure; a driven component rigidly coupled to another static structure; a clutch assembly floating between and coupled to the gearbox and driven component. The clutch may have aligned output and input shafts, defining an engagement surface, a bearing, and a magnetic friction plate coupled and rotating with the input shaft. The plate may have a friction-engagement face, and a magnetic flux generator. The magnetic flux generator may be rigidly coupled to a static housing and partially surrounded in the radial direction by a structure configured to reduce leakage of a magnetic flux, by defining a plurality of voids, which direct multiple passes of the magnetic flux through the engagement surface of the output shaft. The magnetic flux generator may create the magnetic flux that creates a magnetic force between the engagement face and the magnetic friction plate that causes them to engage.

17 Claims, 7 Drawing Sheets

(56) References Cited

U.S. PATENT DOCUMENTS

| | | |
|---|---|---|
| 8,851,258 B2 | 10/2014 | Komorowski et al. |
| 9,017,215 B2 | 4/2015 | Schmitz et al. |
| 9,109,636 B2 | 8/2015 | Kimes et al. |
| 9,291,216 B2 | 3/2016 | Nakano et al. |
| 9,360,057 B2 | 6/2016 | Mogi |
| 9,945,430 B2 | 4/2018 | Fukumura |
| 9,982,725 B2 | 5/2018 | Fukumura |
| 10,099,717 B2 | 10/2018 | Shiina |
| 10,113,596 B2 | 10/2018 | Nakajima et al. |
| 2008/0283352 A1 | 11/2008 | Purvines |
| 2010/0307884 A1 | 12/2010 | Ota et al. |
| 2011/0167940 A1* | 7/2011 | Shavrnoch ........... B62D 5/0448 74/89.36 |
| 2014/0274543 A1* | 9/2014 | Fujii ................. F16D 27/06 475/231 |
| 2017/0051797 A1 | 2/2017 | Yamatani |
| 2017/0102040 A1 | 4/2017 | Staniewicz et al. |
| 2017/0138415 A1 | 5/2017 | Kitayama et al. |
| 2018/0119610 A1 | 5/2018 | Hornbrook |
| 2018/0231071 A1 | 6/2018 | Geiser et al. |
| 2019/0032727 A1 | 1/2019 | Hornbrook et al. |

\* cited by examiner

FIG. 6

ELECTROMAGNETIC CLUTCH FOR GAS TURBINE ACCESSORIES

BACKGROUND

Gas turbine engines require various accessory components, e.g., fuel pumps, oil pumps, electric generators and/or motors, etc., to operate. Often, these components are driven by a turbine through an accessory gearbox. The effects of the failure of one of the accessory components can be propagated back through the accessory gearbox to other accessory components and even the turbine itself. For example, a rotating component could seize, transmitting the seizure torque through the gearbox to the turbine resulting in, at best, less efficient operation and, at worse, critical failure of the engine.

Figure 1:
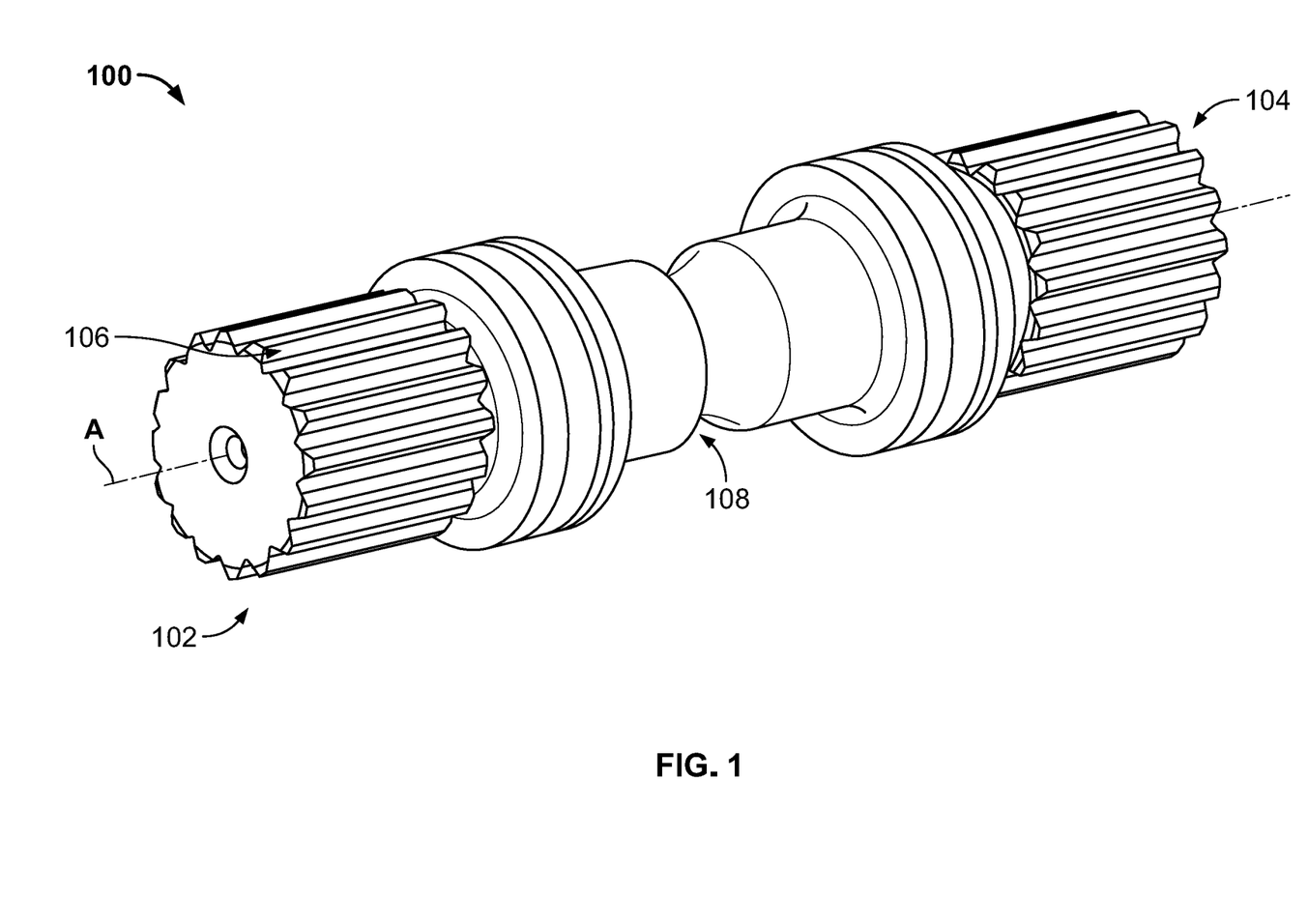
FIG. 1 is a perspective view of a shear-limited shaft.

To prevent these potentially catastrophic failures, components are typically attached to the gearbox with a shear-limited shaft, an example of which is provided in FIG. 1. The shaft 100 may comprise an input shaft (or end) 102 and output shaft (or end) 104. One or both of the input end 102 and output end 104 may have splines 106 that couple with splines on either the gearbox or driven component, respectively. Between the input end 102 and output end 104, the outer diameter of the shaft is reduced, e.g., at the shear protection section 108. Reducing the outer diameter of the shaft reduces the maximum load that can be transmitted through the shaft because the stress in the shaft is increased at this location. Consequently, the shaft can be designed to sustain an expected maximum design load and to fail (e.g., by shearing) when that load is exceeded, e.g., when the attached component seizes or otherwise fails, to protect the engine, gearbox, and/or other accessory components.

In addition to providing protection for the engine in the event of component failure, shaft 100 may further accommodate misalignment between the gearbox and the driven component.

While shaft 100 provides some engine protection and misalignment capabilities, the gearbox side of the shaft must meet aerospace standards for the splines 106 and the seals between the shaft 100 and the gearbox, even during failure of the driven component. This requirement further complicates the use and design of shafts like shaft 100. Additionally, shaft 100 only provides its protective function in an inflexible manner in an extreme situation—when the torque in the shaft 100 exceeds its maximum torque for the driven component.

Improvements are needed in the systems and methods used to couple components to gas turbine engines.

SUMMARY

According to some aspects of the present disclosure, an assembly, may include, a gearbox rigidly coupled to a static structure; a driven component rigidly coupled to another static structure; a clutch assembly floating between and coupled to the gearbox and driven component. The clutch may include an input shaft having an axis; an output shaft aligned with the input shaft, the output shaft defining an engagement surface; a bearing; a magnetic friction plate axially slideably coupled with the input shaft such that the friction plate rotates with the input shaft, the plate having a friction-engagement face; and a magnetic flux generator. The magnetic flux generator may be rigidly coupled to a static housing and is at least partially surrounded in the radial direction by a structure configured to reduce leakage of a magnetic flux. Energizing the magnetic flux generator may create the magnetic flux that penetrates the engagement face, thereby creating a magnetic force between the engagement face and the magnetic friction plate that causes the engagement face and the friction-engagement face to engage. The portion of the structure defines a plurality of voids. The voids may direct multiple passes of the magnetic flux through the engagement surface of the output shaft.

In some embodiments, the structure may be formed by the output shaft. In some embodiments, a portion of the structure is disposed between the magnetic flux generator and the friction plate. Some embodiments may further include a second bearing rotationally coupling the input shaft to the output shaft. In some embodiments, a portion of the input shaft extends radially outward of the first and second bearings at a location axially between the first and second bearings. Some embodiments may further include a second bearing rotationally coupling the input shaft to a static cover. In some embodiments, the bearing is a deep groove bearing. In some embodiments, the bearing is an angular contact bearing. In some embodiments, the bearing may be press fit between the input and output shafts. In some embodiments, each of the input and output shafts may contain a retention member preventing relative axial movement between the input shaft and the output shaft. In some embodiments, the friction plate defines a plurality of splines for coupling the friction plate to the input shaft. In some embodiments, the splines may be located on an axial face of the friction plate that is disposed opposite to the friction-engagement face. In some embodiments, the splines may be located on a radially-inward facing surface of the friction plate. In some embodiments, the magnetic flux generator is located proximate to a radially outer periphery of the clutch assembly.

According to some aspects of the present disclosure a method of assembling an electromagnetic clutch, may include providing an input rotor having a face defining a plurality of radially extending slots and having an axis of rotation; providing a magnetic plate having a first face comprising a friction surface and a second face defining a plurality of splines; the plurality of splines allowing the magnetic plate to float axially between a first non-coupled position and a second coupled position; coupling the input rotor and magnetic plate by inserting the splines of the plate into the slots of the input rotor. The splines and the input rotor may be configured for an axially slideable engagement. The method may also include providing a bearing; providing a first retention member; coupling the bearing and first retention member. The engagement of the bearing and first retention member may be configured to prevent the relative axial movement between the bearing and first retention member in a first direction. The method may also include coupling the input rotor and bearing to prevent the relative axial movement between the input rotor and the bearing in the first direction; providing a second retaining member and a retention fastener; engaging the input rotor and the inner race of the bearing with the second retaining member; engaging the second retaining member and the input rotor with the retention fastener. The engagement of the second retaining member and the input rotor with the retention fastener may be configured to prevent relative axial movement between the second retaining member, the input rotor, and the retention fastener, and may be further configured to prevent relative axial movement between the input rotor and the bearing in a second direction. The method may also include providing an output rotor defining an engagement surface; engaging the bearing and the first retention member with the output rotor. The engagement of the bearing and the first retention member with the output rotor may place the engagement surface of the output rotor in axial opposition to the friction surface of the first face of the magnetic plate and the output rotor substantially aligned with the input rotor. The method may also include providing one or more additional retention fasteners; coupling the output rotor and the first retention member by engaging the output rotor and the first retention member with the one or more additional retention fasteners. The engagement of the output rotor and the first retention member with the one or more additional retention fasteners and the engagement of the outer race of the bearing and the first retention member with the output rotor may prevent both the relative axial movement between the first retention member and bearing in the second direction and the relative axial movement between the output shaft and the first retention member and bearing in both the first and second directions.

Some embodiments may further include providing a magnetic flux generator; inserting the magnetic flux generator into a structure configured to reduce leakage of magnetic flux. The structure may radially surround a portion of the magnetic flux generator. In some embodiments, the output rotor may form the structure. In some embodiments, the magnetic flux generator may be coupled to a static support member.

BRIEF DESCRIPTION OF THE DRAWINGS

The following will be apparent from elements of the figures, which are provided for illustrative purposes.

The present application discloses illustrative (i.e., example) embodiments. The claimed inventions are not limited to the illustrative embodiments. Therefore, many implementations of the claims will be different from the illustrative embodiments. Various modifications may be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

An electromagnetic clutch may replace a shear-limited shaft (e.g., shaft 100) for coupling driven components to a turbine engine (e.g., through an accessory gearbox). This electromagnetic clutch provides improvements over prior systems and methods. For example, the respective speeds of the driven component and turbine (or gearbox) may be monitored for deviations from the designed gear ratio—an indication of clutch slippage that may be an early sign of the potential failure (or future failure) of a component. When this indication is observed, the electromagnetic clutch can be opened. Additionally, slippage may occur at a much lower torque, resulting in faster fault isolation and earlier protective action. Additionally, debris from the shearing of shaft 100 is eliminated because no shearing is needed to protect the engine by isolating the faulty component.

Figure 2:
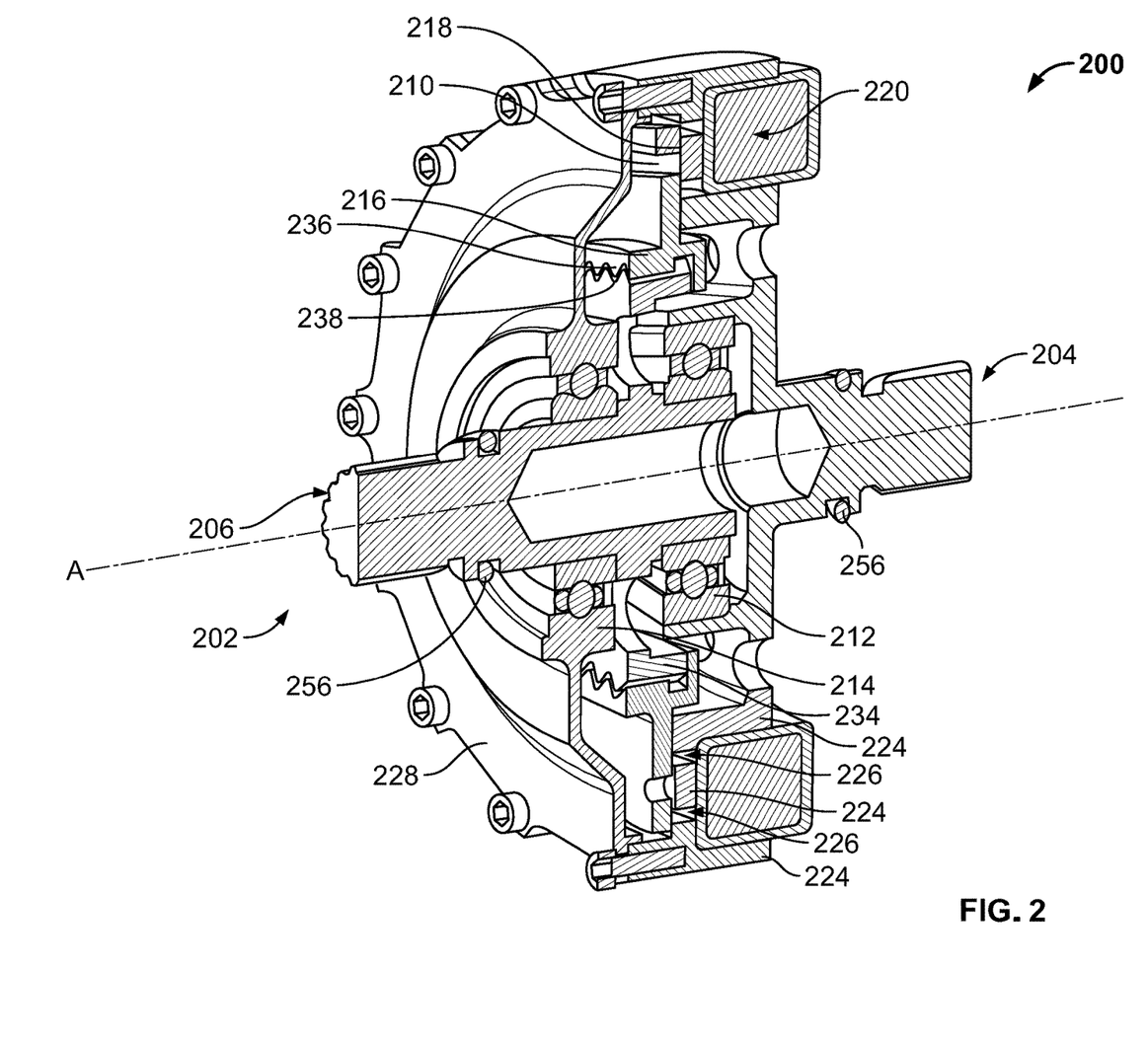
FIG. 2 is a perspective view of an electromagnetic clutch assembly in accordance with some embodiments

In accordance with some embodiments, a perspective view of an electromagnetic clutch assembly 200 is provided in FIG. 2. The assembly 200 may comprise an input shaft 202, output shaft 204, bearings 212 and 214, magnetic friction plate 216, and cover 228. Input shaft 202 may have an axis 'A', which may be aligned with the axis about which output shaft 204 rotates.

In input shaft 202 may be coupled to turbine (e.g., through an accessory gearbox) via splines 206. Input shaft 202 may be coupled to the cover 228 via bearing 214, which may be a deep groove bearing. Input shaft 202 may be further coupled to output shaft 204 via bearing 212, which also may be a deep groove bearing. Bearings 212 and 214 may be press-fit onto input shaft 202 and/or output shaft 204

Input shaft 202 may have a radially extending member 234. Member 234 may extend radially outward from shaft 202 at a location that is axially between bearings 212 and 214. Member 234 have extend radially outward of the bearings 212 and 214. Member 234 may define, on its radially outer surface, a plurality of slots 238, which may be formed by a plurality of splines. The splines may run parallel to axis 'A' around a circumference of member 234.

Slots 238 are configured to interface with the splines 236 magnetic friction plate 216. Splines 236 may be located on a radially inner surface of magnetic friction plate 216. Splines 236 may be parallel to axis 'A' and extend around the radially inner surface of magnetic friction plate 216. Splines 236 may engage slots 238 such that the magnetic friction plate 216 can slide (or "float"), relative to input shaft 202, in the axial direction while both the magnetic friction plate 216 and input shaft 202 rotate together. Plate 216 may move between a first position in which it is not coupled to surface 210 and a second position in which plate 216 is coupled to surface 210.

Figure 3A:
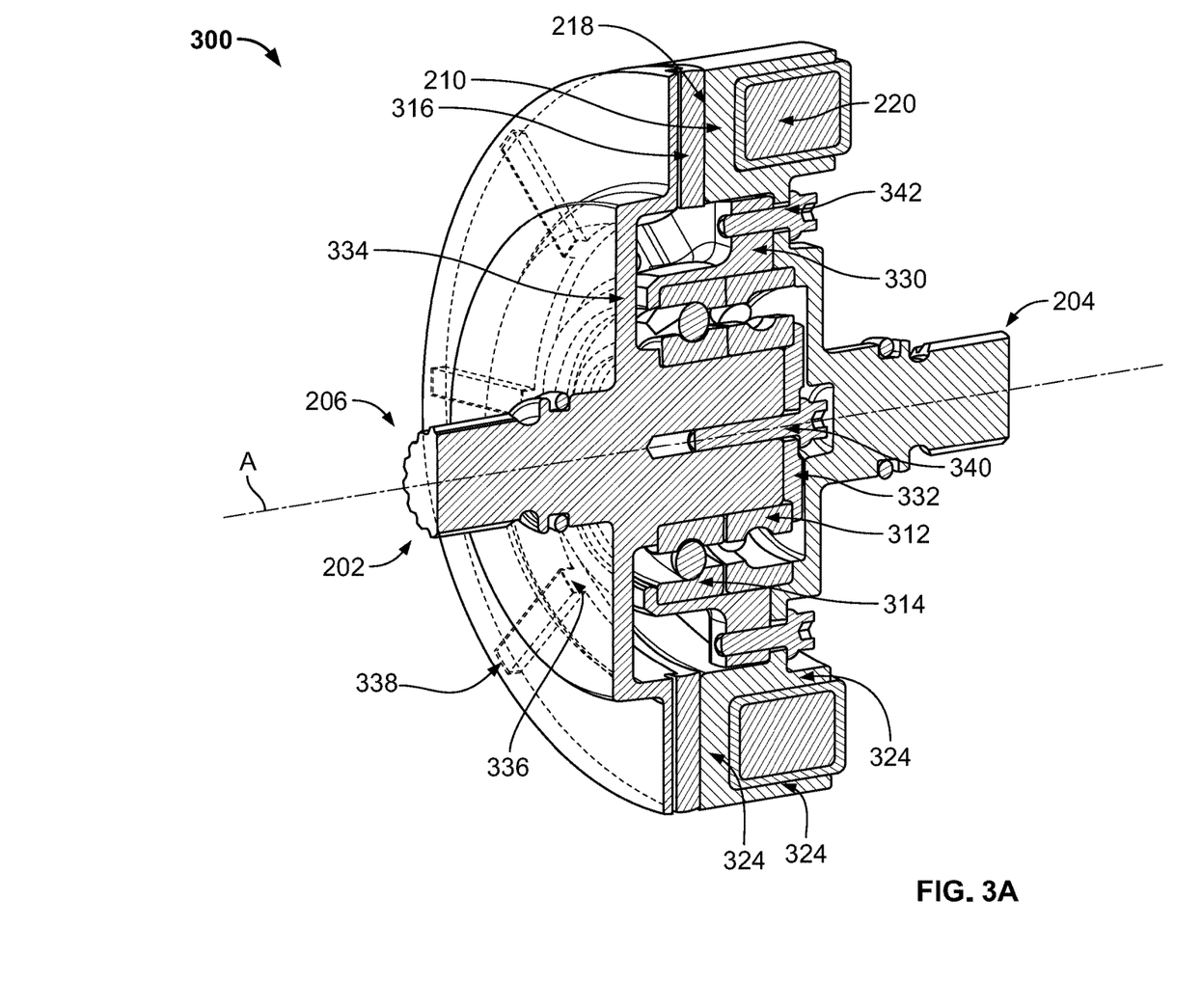
FIGS. 3A and 3B are perspective view of an electromagnetic clutch assembly in accordance with some embodiments.
Figure 3B:
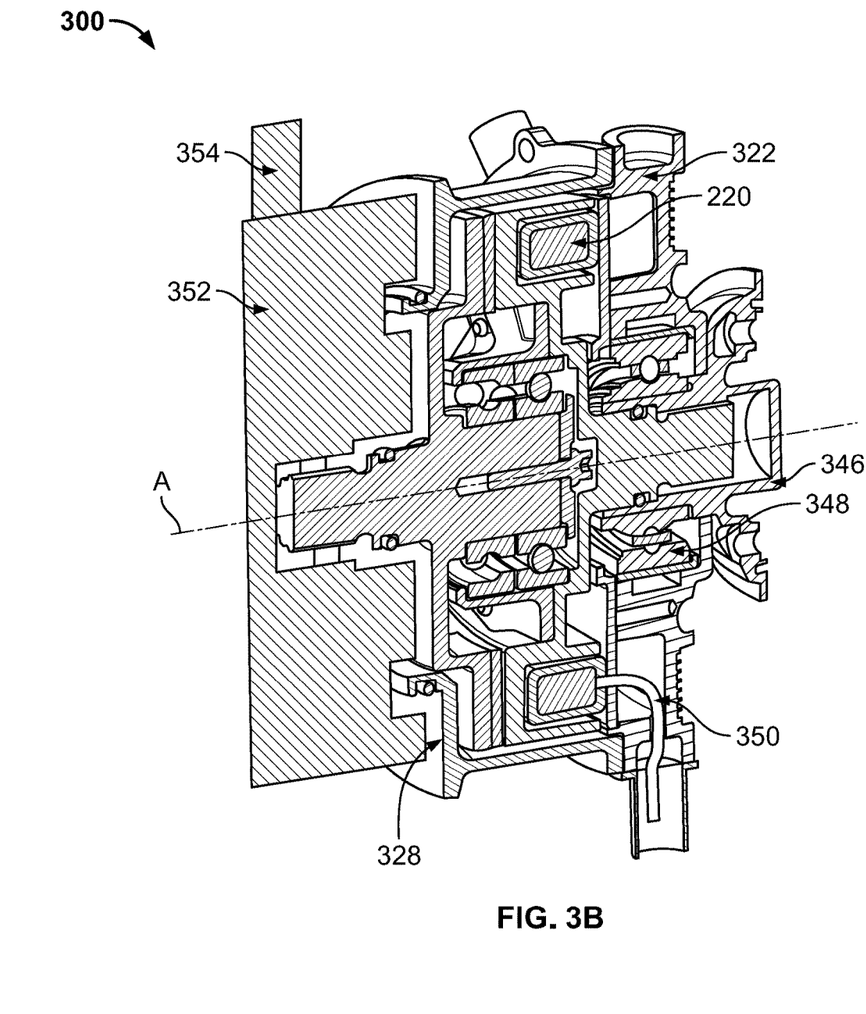

Output shaft 204 may be connected to a driven component (see FIG. 3B). Output shaft 204 may define engagement surface 210. During operation, a magnetic flux generator 220 is energized, thereby creating a magnetic flux that passes through and magnetizes engagement surface 210. The magnetization of surface 210 causes a magnetic force of attraction between surface 210 and plate 216. This force draws the magnetic plate 216 axially, until the friction plate surface 218 of magnetic friction plate 216 is engaged with engagement surface 210. This engagement allows torque to be transmitted through the input shaft 202 and friction plate 216 to output shaft 204 that drives the driven component. When magnetic flux generator 220 is de-energized, a biasing spring (not shown) may apply a force to magnetic friction plate 216 that moves and disengages plate 216 from engagement surface 210.

Output shaft 204 may further define structure 224. Structure 224 may be coupled to cover 228 by, e.g., a plurality of bolts. As such, cover 228 rotates with the output shaft 204. Cover 228 may be covered by a static covering (see, e.g., FIG. 3B). Structure 224 is configured to prevent and/or reduce the leakage of magnetic flux from the magnetic flux generator 220. Structure 224 achieves this function by directing the magnetic flux toward the engagement surface 210. Structure 224 may surround a portion of the magnetic flux generator 220. For example, structure may be located radially inward and/or outward of the magnetic flux generator 220 along some portion, e.g., ¼, ⅓, ½, ⅔, ¾, or all of the axial length of generator 220. Structure 224 may also be axially disposed between the friction plate 216 and the magnetic flux generator 220. Structure 224 may define voids, e.g., voids 226 that function to create a magnetic circuit having multiple passes through the engagement surface 210 and plate 216. The multiple passes created by voids 226 permit clutch 200 to transmit a higher torque for a given current (or equal torque for less current) than a design without voids. To achieve this, a portion of the engagement surface 210 may be formed by structure 224. Structure 224, being defined by output shaft 204, rotates with output shaft 204 around magnetic flux generator 220, which is rigidly coupled to a static support structure (see FIG. 3B).

Magnetic flux generator 220 may be, e.g., an electric coil to which a voltage is applied, a solenoid magnetomotive force generator, etc. Magnetic flux generator 220 may be located near an outer periphery of assembly 200.

In some embodiments, a spring(s) (not shown) may be placed between bearings 212 and 214 in order to help maintain the axial spacing therebetween. These spring may extend from each of bearings 212 and 214 and engage member 234. In some embodiments, the spring may extend from one inner race of bearing 212 to the inner race of bearing 214 through a passage in member 234. In some embodiments, member 234 may not be located axially between bearings 212 and 214 (see, e.g., FIG. 3A) such that the spring need not pass through or engage member 234, nor be coupled only to the inner races of the bearings.

In some embodiments, assembly 200 comprises o-rings 256. O-rings 256 may help seal the interface between assembly 200 and the gearbox and component to which it is attached (see FIG. 3B), as well as damp vibrations.

In accordance with some embodiments, an electromagnetic clutch assembly 300 is provided in FIGS. 3A and 3B. The assembly 300 may comprise components, e.g., input shaft 202, output shaft 204, splines 206, engagement surface 210, and friction plate surface 218 that perform the same functions as those described above.

As shown in FIG. 3A, the radially extending member 334 of input shaft 202 is not located axially between bearings 312 and 314, unlike the radially extending member 234 and bearings 212 and 214 of FIG. 2. Additionally, radially extending member 334 defines slots 338 on an axial face (a face that extends in the radial and circumferential directions). These axial slots allow for the relative, axial movement between magnetic fiction plate 316 and the input shaft 202 which couples the rotation of the two. To facilitate this coupling, magnetic fiction plate 316 defines splines 336 on an axial face of the magnetic fiction plate 316 that is disposed on the opposite side of magnetic fiction plate 316 as friction plate surface 218.

Like the output shaft 204 show in FIG. 2, the output shaft 204 in FIG. 3A also defines a structure 324 for preventing and/or minimizing the loss of magnetic flux like structure 224. However, structure 324 extends axially along generator 220 in both radially directions—i.e., structure 324 is also located radially outward of generator 220.

While bearings 212 and 214 where described as being press fit, the method of coupling the input and output shafts 202 and 204 to bearings 312 and 314 is slightly different in FIG. 3A. For example, bearing support 330 may be mounted on a radially outward surface of bearings 312 and 312. Additionally, bearing support 330 may have a radially inward extension that covers, at least partially, one or more axial faces of on the bearings. Bearing 312 and the bearing support 330 may be in contact with the output shaft 204, and retention fasteners 342 may secure this contact. A plurality of retention fasteners 342 may be disposed at various locations about the circumference of the output shaft 204. Bearing support 330 may comprise a non-magnetic material such that less or no magnetic flux is leaked into bearing support 300.

Bearings 312 and 314 may be coupled to input shaft 202 by a retaining force transmitted between a portion of the radially extending member 334 of input shaft 202 and retention member 332. Retention member 332 may extend across the radius of input shaft 202 at one end and engage bearings 312. Retention fastener 340 may be threadingly engaged to input shaft 202 until retention fastener 340 engages and holds retention member 332 in contact with bearing 312.

Bearings 312 and 314 may be, e.g., deep groove bearings or high precision angular contact bearings.

FIG. 3B illustrates the assembly 300 in relation to surrounding static structure. For example, radially extending member 334 of input shaft 202 may be at least partially surrounded by static cover 328 that is secured to static housing 322. Generator 220 is also secured to static housing 322. Static housing 322 may provide a conduit for routing wiring 350 to generator 220.

Further illustrated in FIG. 3B is a portion of the driven component 346 and gearbox 352 to which the clutch assembly 300 is coupled. Component 346 may be coupled to the static housing 322 via bearing 348. In some embodiments, output shaft 204 may extend to the rear of the driven component. Gearbox 352 may contain a plurality of gears (not shown). One of the gears may be coupled to input shaft 202. Gearbox 352 may be coupled to static structure 354. The clutch assembly 300 is a floating design because it is not directly coupled to any static structure. Rather, the clutch 300 is supported by the static structure (354 and/or 322) only through its coupling to gearbox 352 and driven component 346.

Figure 4:
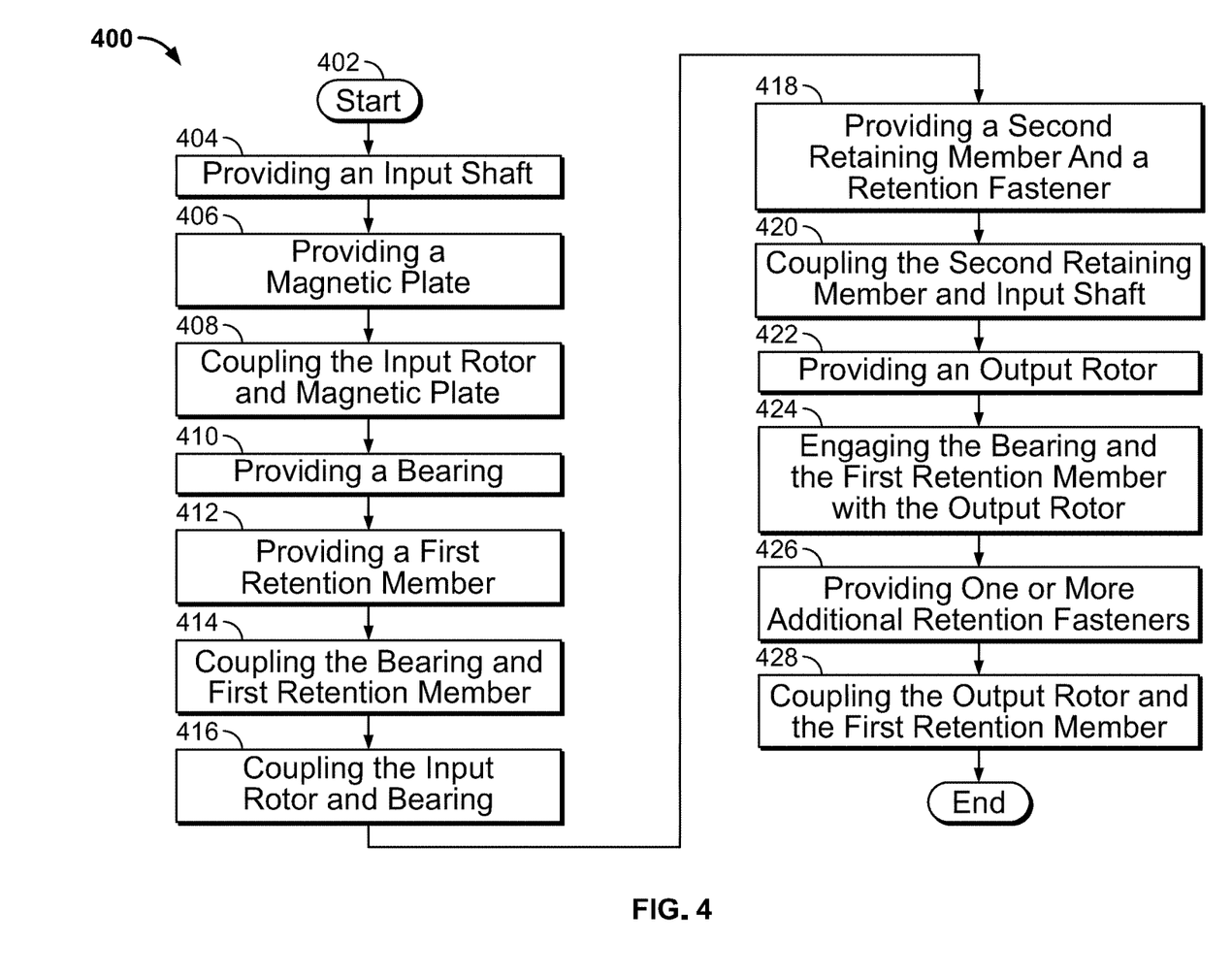
FIG. 4 illustrates a method of assembling an electromagnetic clutch in accordance with some embodiments.

In accordance with some embodiments, a method 400 of assembly an electromagnetic clutch is provided in FIG. 4. The method starts at block 402. At block 404, an input shaft is provided. The input shaft may have a face/surface that defines a plurality of extending slots, which may extend in the radially direction. The input shaft defines a rotational axis. At block 406, a magnetic plate is provided. The magnetic plate may have a first face that comprises a friction surface and a second face that defines a plurality of splines. The second face may be disposed opposite to the first face. In some embodiments, the second face may be located on a radially inward face surface. The magnetic plate and input shaft are coupled at block 408. This coupling may be achieved by inserting the splines of the plate in to the slots of the input shaft. The splines and slots may engage one another in an axially slideable manner. A block 410, a bearing is provided. The bearing may have an inner race and an outer race. At block 412, a first retention member is provided. In some embodiments, a retention member may be a bearing race that is press fit onto or into a structure, e.g., a rotor, housing, etc. At block 414, the bearing and the first retention may be coupled. For example, the outer race of the bearing may be engaged with the first retention member. This engagement may prevent the relative axial movement between the first retention member and the bearing in at least a first direction (e.g., axially forward or aft). At block 416, the input shaft and bearing are coupled. This coupling may be achieved by engaging the input shaft with the inner race of the bearing. This engagement may be configured to prevent relative axial movement between the bearing and the input shaft. This may be achieved by a structure, e.g., a shoulder, on the shaft. At block 418, a second retaining member and a retention fastener are provided. At block 420, the second retaining member and input shaft may be coupled. This coupling may be achieved by engaging the input rotor and the inner race of the bearing with the second retaining member. Then, the second retaining member and input rotor may be engaged with the retention fastener. This engagement may be configure to prevent the relative axial movement between the second retaining member, the input rotor, and the retention faster. Further, this engagement may prevent/resist the relative axial movement between the input shaft and the bearing in the axial direction.

An output shaft may be provided at block 422. The output shaft may define an engagement surface. At block 424, the bearing and the first retention member may be engaged with the output shaft. This engagement may align the engagement surface of the output shaft with the with the friction surface of the plate such that the two are axially opposed, and may further axially align the axes of the input and output shafts. At block 426, one or more additional retention fasteners may be provided. At block 428, the output shaft is coupled to the first retention member. This coupling may be achieved by engaging the output shaft and first retention member with the one or more additional retention fastener. This engagement prevents the relative axial movement between the output shaft and both the bearing and the first retention member.

The method may further comprise providing a magnetic flux generator. The magnetic flux generator may be inserted into a structure that is configured to reduce the leakage of magnetic flux by radially surround at least a portion of the flux generator with an appropriate material. This structure may be formed by the output rotor as described above with respect to FIGS. 2, 3A, and 3B. The flux generator may be coupled to a static structure.

Figure 5A:
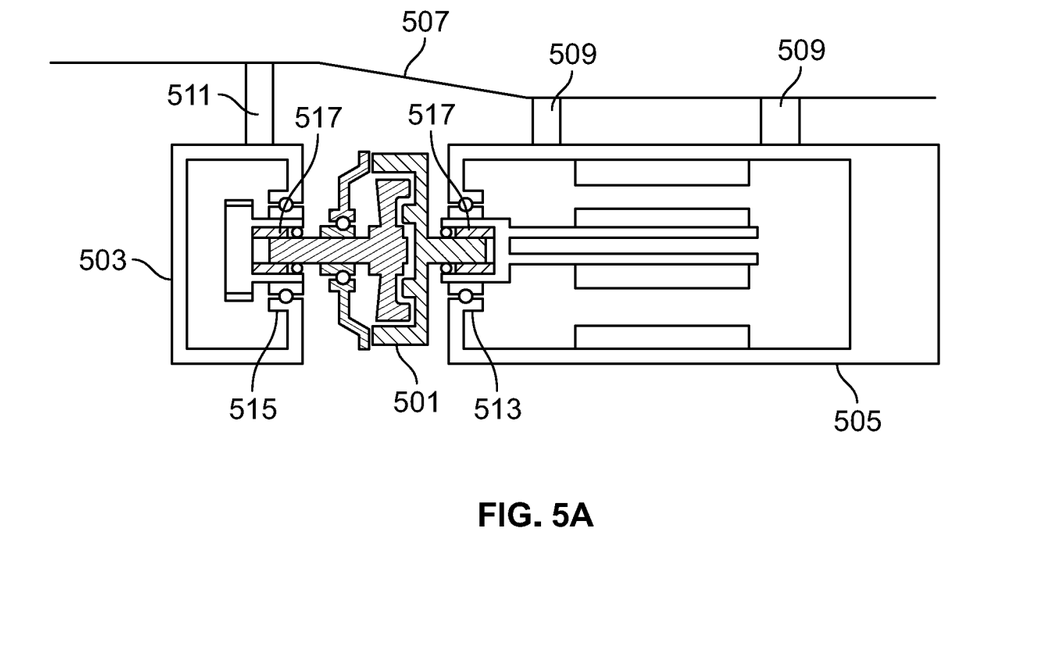
FIGS. 5A and 5B illustrate the connections of the clutch starter generator and gear box in accordance with some embodiments.
Figure 5B:
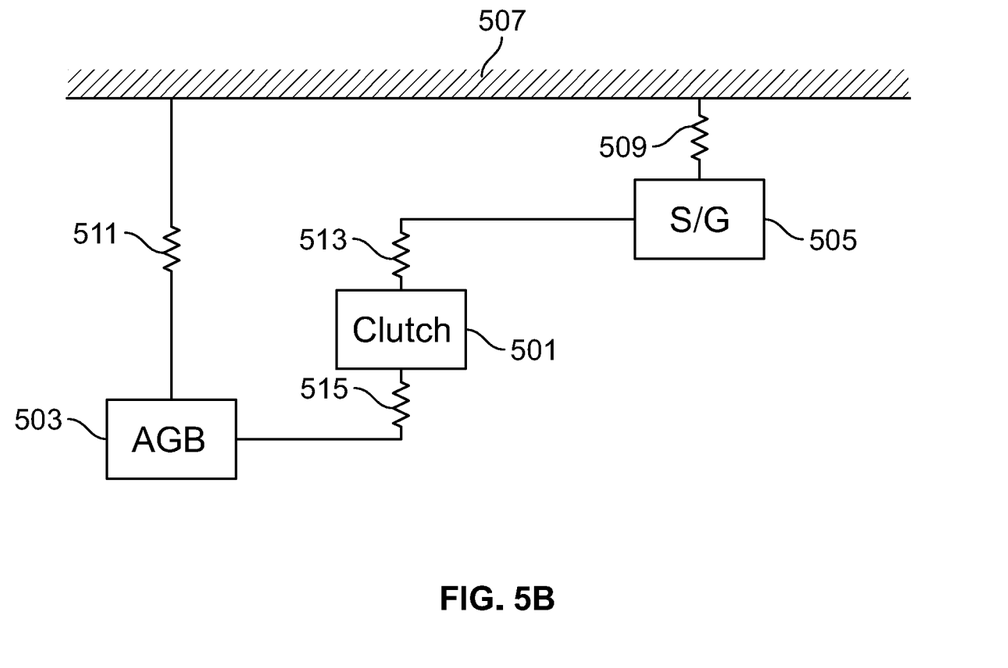

FIG. 5A is a shows a placement of the magnetic clutch 501 in accordance with some embodiments. The output shaft may connect to and drive or receive input from an electric starter generator 505, while the input shaft may drive or receive input from an auxiliary gear box 503. FIG. 5B shows a representation of the dynamic connections in accordance with some embodiments. As can be seen, an auxiliary gear box 503 may mount on to the casing 507 of a turbine. This AGB mount 511 may be configured to dampen vibration from the turbine engine. The starter generator 505 may also be mounted on to the casing of a turbine engine with a S/G mount 509 configured to dampen vibration from the turbine engine. The clutch 501 may be mounted to the auxiliary gear box 503 and the starter generator 505. The clutch mounts 513, 515 may be configured to float the clutch 501 between the starter generator 505 and the auxiliary gear box 503. The clutch 501 may attach to the starter generator and the auxiliary gearbox with splines 517. This enables use of the clutch without the need to mount the clutch directly to the turbine casing, allows for misalignments and allows for replacement and repair of the clutch alone as well as reducing the overall complexity and may result in a reduction of both weight and cost.

Figure 6:
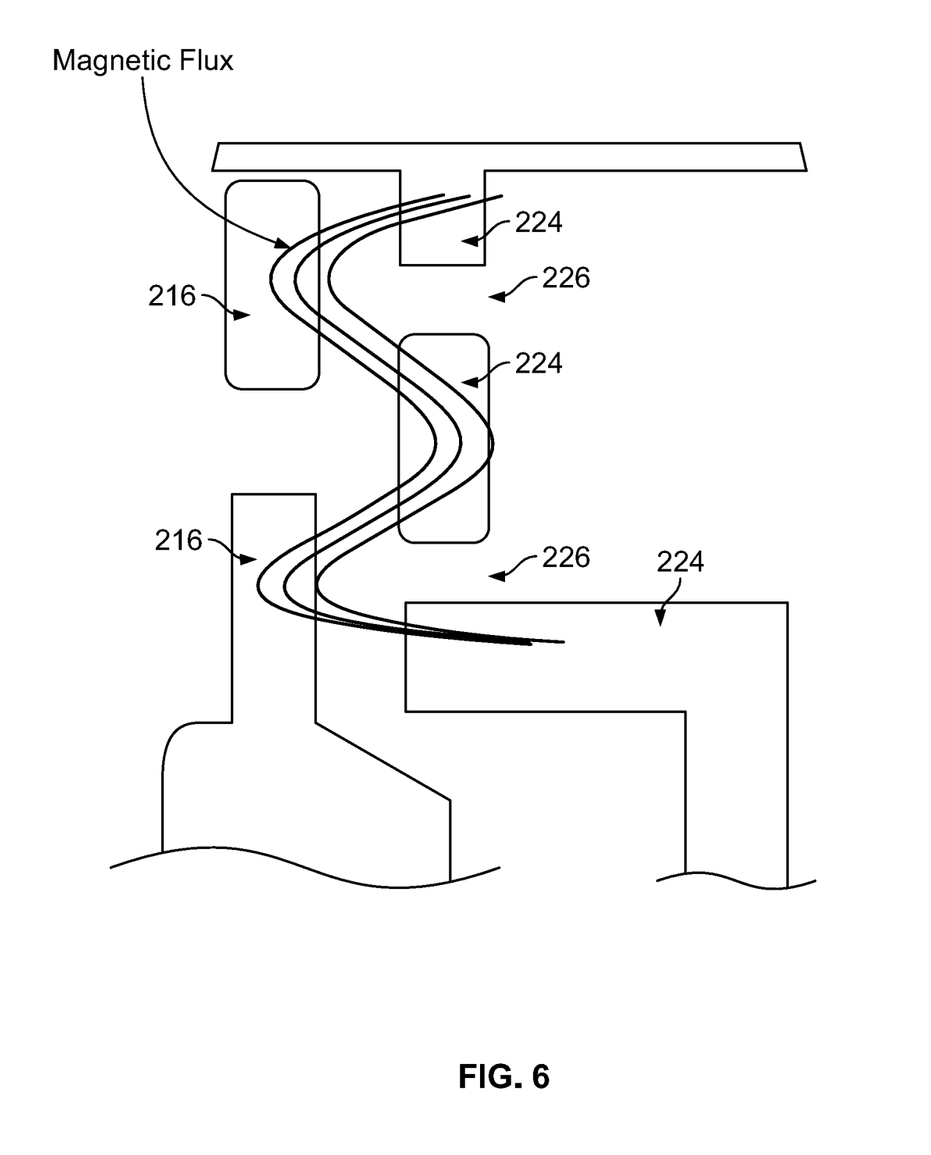
FIG. 6 illustrates the magnetic flux created in accordance with some embodiments.

FIG. 6 shows a close up view of the magnetic friction plate 216 and the structure 224. As can be seen the structure 224 may conduct a magnetic flux. The structure 224 combined with the voids 226 may direct the magnetic flux into the magnetic friction plate in a way such that multiple connections with the magnetic friction plate 216 may be made. This in turn reduces the leakage and may produce a stronger interaction than would be made if no void spaces existed.

Although examples are illustrated and described herein, embodiments are nevertheless not limited to the details shown, since various modifications and structural changes may be made therein by those of ordinary skill within the scope and range of equivalents of the claims.

What is claimed is:

1. An assembly, comprising:
   a gearbox rigidly coupled to a first static structure;
   a driven component rigidly coupled to a second static structure;
   a clutch assembly floating between and coupled to the gearbox and the driven component, the clutch assembly comprising:
   an input shaft having an axis;
   an output shaft aligned with the input shaft, the output shaft defining an engagement surface;
   a bearing;
   a magnetic friction plate axially slideably coupled with the input shaft such that the magnetic friction plate rotates with the input shaft, the magnetic friction plate having a friction-engagement face; and
   a magnetic flux generator, wherein the magnetic flux generator is rigidly coupled to a static housing and is at least partially surrounded in a radial direction by a structure configured to reduce leakage of a magnetic flux,
   wherein energizing the magnetic flux generator creates the magnetic flux that penetrates the engagement surface, thereby creating a magnetic force between the engagement surface and the magnetic friction plate that causes the engagement surface and the friction-engagement face to engage, and
   wherein the structure defines a plurality of voids, wherein the voids direct multiple passes of the magnetic flux through the engagement surface of the output shaft, and wherein the structure is formed by the output shaft.

2. The clutch of claim 1, wherein a portion of the structure is disposed between the magnetic flux generator and the friction plate.

3. The clutch of claim 1, wherein the bearing is a first bearing, further comprising a second bearing rotationally coupling the input shaft to said output shaft.

4. The clutch of claim 3, wherein a portion of the input shaft extends radially outward of the first and second bearings at a location axially between the first and second bearings.

5. The clutch of claim 1, further comprising a second bearing rotationally coupling the input shaft to a static cover.

6. The clutch of claim 1, wherein the bearing is a deep groove bearing.

7. The clutch of claim 1, wherein the bearing is an angular contact bearing.

8. The clutch of claim 1, wherein the bearing is press fit between the input and output shafts.

9. The clutch of claim 1, wherein each of the input and output shafts comprise a retention member preventing relative axial movement between the input shaft and the output shaft.

10. The clutch of claim 1, wherein the magnetic friction plate defines a plurality of splines for coupling the magnetic friction plate to the input shaft.

11. The clutch of claim 10, wherein the plurality of splines are located on an axial face of the magnetic friction plate that is disposed opposite to the friction-engagement.

12. The clutch of claim 10, wherein the plurality of splines are located on a radially-inward facing surface of the magnetic friction plate.

13. The clutch of claim 1, wherein the magnetic flux generator is located proximate to a radially outer periphery of the clutch assembly.

14. A method of assembling an electromagnetic clutch, comprising:
   providing an input rotor having a face defining a plurality of radially extending slots and having an axis of rotation;
   providing a magnetic plate having a first face comprising a friction surface and a second face defining a plurality of splines; the plurality of splines allowing the magnetic plate to float axially between a first non-coupled position and a second coupled position;
   coupling the input rotor and the magnetic plate by inserting the plurality of splines of the magnetic plate into the plurality of radially extending slots of the input rotor, wherein the plurality of splines and the input rotor are configured for an axially slideable engagement;
   providing a bearing;
   providing a first retention member;
   coupling the bearing and first retention member, wherein the engagement of the bearing and first retention member is configured to prevent the relative axial movement between the bearing and the first retention member in a first direction;
   coupling the input rotor and bearing to prevent the relative axial movement between the input rotor and the bearing in the first direction;
   providing a second retaining member and a retention fastener;
   engaging the input rotor and an inner race of the bearing with the second retaining member;
   engaging the second retaining member and the input rotor with the retention fastener, wherein the engagement of the second retaining member and the input rotor with the retention fastener is configured to prevent relative axial movement between the second retaining member, the input rotor, and the retention fastener, and is further configured to prevent relative axial movement between the input rotor and the bearing in a second direction;
   providing an output rotor defining an engagement surface;
   engaging the bearing and the first retention member with the output rotor, wherein the engagement of the bearing and the first retention member with the output rotor places the engagement surface of the output rotor in axial opposition to the friction surface of the first face of the magnetic plate and the output rotor substantially aligned with the input rotor;
   providing one or more additional retention fasteners;
   coupling the output rotor and the first retention member by engaging the output rotor and the first retention member with the one or more additional retention fasteners, wherein the engagement of the output rotor and the first retention member with the one or more additional retention fasteners and the engagement of the outer race of the bearing and the first retention member with the output rotor prevents both the relative axial movement between the first retention member and bearing in the second direction and the relative axial movement between the output shaft and the first retention member and bearing in both the first and second directions.

15. The method of claim 14, further comprising:
   providing a magnetic flux generator;
   inserting the magnetic flux generator into a structure configured to reduce leakage of magnetic flux, wherein the structure radially surrounds a portion of the magnetic flux generator.

16. The method of claim 15, wherein the output rotor forms the structure.

17. The method of claim 16, wherein the magnetic flux generator is coupled to a static support member.

* * * * *